US011597551B2

(12) United States Patent
Chin

(10) Patent No.: US 11,597,551 B2
(45) Date of Patent: Mar. 7, 2023

(54) AIR EXTRACTING DEVICE AND METHOD FOR CALCULATING REMAINING TIME REQUIRED FOR EXTRACTING ACTION

(71) Applicant: Tsu-Ching Chin, Hsinchu County (TW)

(72) Inventor: Tsu-Ching Chin, Hsinchu County (TW)

(*) Notice: Subject to any disclaimer, the term of this patent is extended or adjusted under 35 U.S.C. 154(b) by 462 days.

(21) Appl. No.: 16/934,821

(22) Filed: Jul. 21, 2020

(65) Prior Publication Data
US 2021/0025746 A1 Jan. 28, 2021

(30) Foreign Application Priority Data
Jul. 25, 2019 (TW) .................................. 108126346

(51) Int. Cl.
*B65B 31/04* (2006.01)
*B65B 57/18* (2006.01)

(52) U.S. Cl.
CPC ............ *B65B 31/048* (2013.01); *B65B 31/04* (2013.01); *B65B 57/18* (2013.01); *B65B 31/047* (2013.01)

(58) Field of Classification Search
CPC ..... B65B 31/04; B65B 31/047; B65B 31/048; B65B 57/18
USPC ..................... 53/403, 405, 434, 508, 79, 512
See application file for complete search history.

(56) References Cited

U.S. PATENT DOCUMENTS

| 5,195,427 A * | 3/1993 | Germano ............... B65B 31/047 206/524.8 |
| 5,528,880 A * | 6/1996 | Landolt ................... B65B 31/02 53/434 |
| 5,655,357 A * | 8/1997 | Kristen ................... B65B 31/04 53/512 |
| 6,520,071 B1 * | 2/2003 | Lanza ................... B65B 31/047 141/96 |
| 7,021,027 B2 * | 4/2006 | Higer .................... B65B 31/046 53/434 |
| 11,027,707 B1 * | 6/2021 | Strong et al. ............. F04F 5/48 |

(Continued)

FOREIGN PATENT DOCUMENTS

CN 201761784 U * 3/2011
CN 102032140 A * 4/2011
(Continued)

*Primary Examiner* — Stephen F. Gerrity
(74) *Attorney, Agent, or Firm* — Chun-Ming Shih; HDLS IPR Services

(57) ABSTRACT

An air extracting device (2) at least includes a processor (21), a motor (23), an air-extracting unit (24), and a wireless transmitting unit (25), and a method of the air extracting device (2) for calculating remaining time required for extracting action includes following steps: activating the motor (23) after the air extracting device (2) and a sealed bag (1) are jointed together; driving the air-extracting unit (24) to execute an extracting action by the activated motor (23) for extracting air from the sealed bag (1); monitoring load current of the motor (23) by the processor (21) while executing the extracting action; calculating a remaining time required for the extracting action by the processor (21) according to a variation of the load current; and, transmitting the remaining time required for the extracting action to a mobile device (4) through the wireless transmitting unit (25) for displaying thereon.

10 Claims, 6 Drawing Sheets

(56) References Cited

U.S. PATENT DOCUMENTS

| | | | | |
|---|---|---|---|---|
| 2003/0182900 A1* | 10/2003 | Bowden et al. | ...... | B65B 31/047 53/510 |
| 2006/0053748 A1* | 3/2006 | Ahn et al. | ............. | B65B 31/046 53/512 |
| 2013/0309099 A1* | 11/2013 | Irving et al. | .......... | F04C 11/008 417/17 |
| 2020/0165020 A1* | 5/2020 | Bourrec | .................. | B65B 31/04 |
| 2020/0198824 A1* | 6/2020 | Wu et al. | ................. | B65B 57/18 |
| 2021/0031956 A1* | 2/2021 | Schandel et al. | ..... | B65B 31/048 |

FOREIGN PATENT DOCUMENTS

| | | | | | |
|---|---|---|---|---|---|
| CN | 107082194 A | * | 8/2017 | ......... | B65D 81/2015 |
| JP | 05162702 A | * | 6/1993 | | |
| JP | 2010281214 A | * | 12/2010 | | |
| JP | 2016150756 A | * | 8/2016 | | |

\* cited by examiner

AIR EXTRACTING DEVICE AND METHOD FOR CALCULATING REMAINING TIME REQUIRED FOR EXTRACTING ACTION

BACKGROUND OF THE INVENTION

1. Technical Field

The technical field relates to an air extracting device, and specifically to an air extracting device capable of calculating a remaining time required for an extracting action, and a method adopted by the air extracting device for calculating the remaining time required for the extracting action.

2. Description of Related Art

Vacuum extracting devices have been provided in the market for compressing a user's storage spaces (such as a luggage case). A user can put select items, such as shirts and pants, into a sealed bag, and the vacuum extracting device can then extract air from the inside of the sealed bag to create a vacuum (or a condition near vacuum) in the sealed bag, so as to compress the contents of the entire sealed bag and help the user store the items more easily.

However, for the sake of use, the vacuum extracting devices currently provided in the market are only available with small volumes, which means that they can only provide a weak power to extract air. Generally, creating a vacuum or a condition near vacuum in a sealed bag with a normal size takes at least five to ten minutes, which is a time-consuming task for the user.

Additionally, the current vacuum extracting devices are incapable of telling the user the remaining time required for its extracting action on a sealed bag, so the user cannot know when the extracting action will be completed. In this scenario, all the user can do is to wait beside the vacuum extracting device and to monitor the sealed bag with their bare eyes, and the user has to turn the vacuum extracting device off manually when they determine that the inside of the sealed bag becomes a vacuum or reaches a condition near vacuum, which is a time-wasting operation.

SUMMARY OF THE INVENTION

The disclosure is directed to an air extracting device and a method for calculating remaining time required for extracting action, which can predict a remaining time required for an extracting action executed by the air extracting device for extracting air as many as possible from the inside of a sealed bag, so as to improve the usage experience of a user.

In one of the exemplary embodiments, the air extracting device is used to extract air from an inner space of a sealed bag, and includes:

a power port, connected to a power supply;

a processor electrically connected with the power port, configured to receive a load current provided by the power supply through the power port;

a wireless transmitting unit electrically connected with the processor, configured to wirelessly connect to an external mobile device for the air extracting device;

a motor electrically connected with the processor, configured to receive the load current from the processor for rotating; and an air extracting unit electrically connected with the motor, jointed with the sealed bag for the air extracting device, and driven by the motor to execute an extracting action for extracting air from a confined space inside the sealed bag;

wherein, the processor is configured to monitor the load current required by the motor while the air extracting unit executes the extracting action, and is configured to calculate a remaining time required for the extracting action to be completed based on a variation of the load current, wherein the load current is inversely proportional to an air amount remained in the confined space;

wherein, the processor transmits the calculated remaining time to the mobile device to be displayed thereon through the wireless transmitting unit.

In another one of the exemplary embodiments, the method for calculating remaining time required for extracting action includes following steps:

a) receiving a load current from a power supply by the processor for controlling the motor to rotate;

b) driving the air extracting unit to execute an extracting action by the rotated motor for extracting air from a confined space inside the sealed bag;

c) continually monitoring the load current required by the motor by the processor while the air extracting unit executes the extracting action, wherein the load current is inversely proportional to an air amount remained in the confined space;

d) calculating a remaining time required for the extracting action to be completed according to a variation of the load current; and e) transmitting the calculated remaining time required for the extracting action to an external mobile device to be displayed on the mobile device by the processor through the wireless transmitting unit.

In comparison with related art, the present invention can predict the remaining time required for the extracting action executed for extracting air from the inside of the sealed bag as much as it can based on the rotating status of the motor. By using the device and the method, a user can clearly know how much time the air extracting device still needs before the extracting action is completed. Therefore, the user does not have to wait beside the air extracting device, which prevents the user from wasting time and is also improves ease of scheduling.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1A:
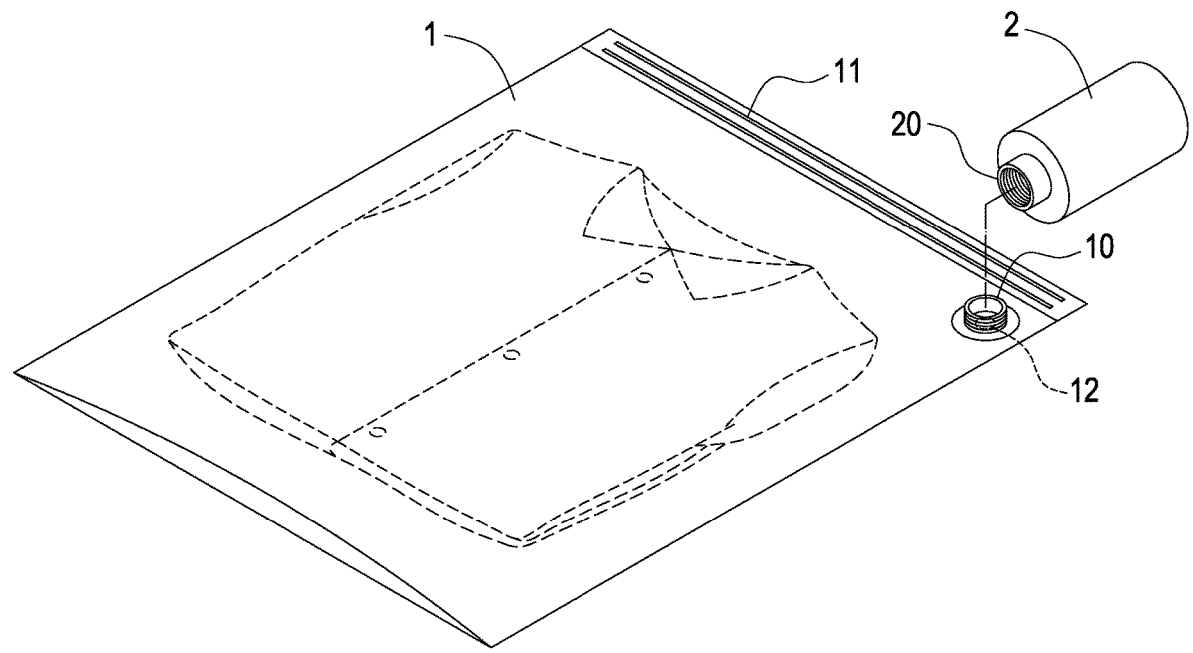
FIG. 1A is an air extracting device using diagram of a first embodiment according to the present invention.
Figure 1B:
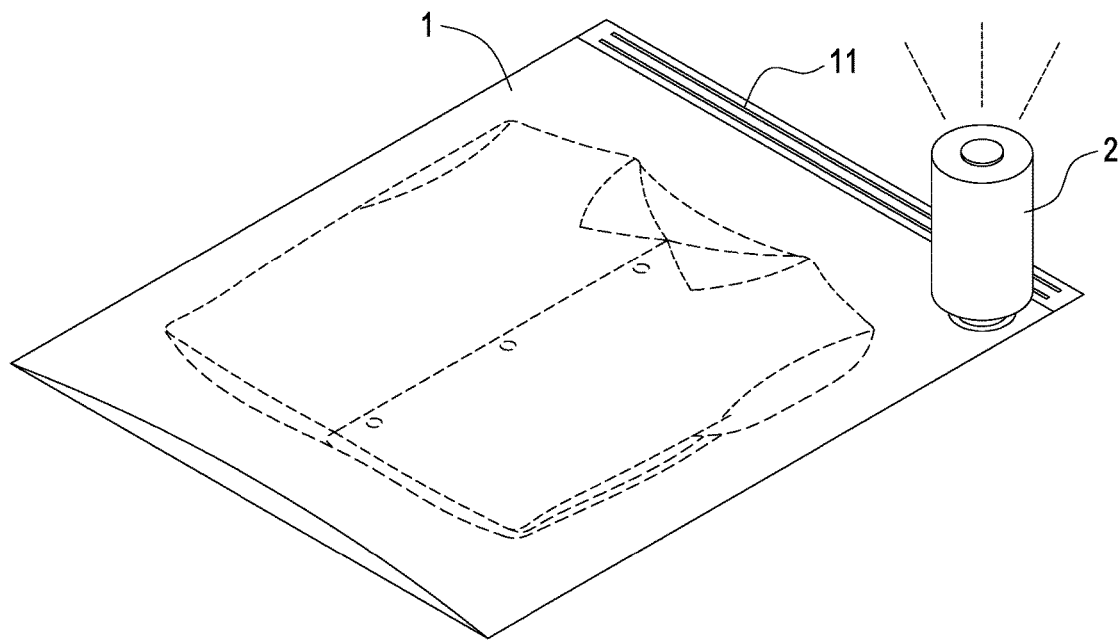
FIG. 1B is an air extracting device using diagram of a second embodiment according to the present invention.

Please refer to FIG. 1A and FIG. 1B, wherein FIG. 1A is an air extracting device using a diagram of a first embodiment according to the present invention, FIG. 1B is an air extracting device using a diagram of a second embodiment according to the present invention. As shown in FIG. 1A and FIG. 1B, the present invention discloses an air extracting device capable of calculating a remaining time required for an extracting action (referred to as the air extracting device 2 hereinafter). The air extracting device 2 is used to extract air from the inside of a sealed bag 1, and to create a vacuum or a condition near vacuum in the sealed bag 1, so as to compress the volume of the sealed bag 1 itself.

As disclosed in FIG. 1A, the sealed bag 1 has an opening at one side and at least one seal bar 11 is arranged near the opening. An output interface 10 is arranged on the sealed bag 1, and a valve 12 has been set in the output interface 10. A user can put items into the sealed bag 1 through the opening, and can then press the seal bar 11 to create a confined space inside the sealed bag 1.

An input interface 20 is arranged on one end of the air extracting device 2, wherein the shape and the size of the input interface 20 corresponds to the shape and the size of the output interface 10 of the sealed bag 1. In one embodiment, the output interface 10 has a first screw thread, the input interface 20 has a second screw thread which corresponds to the first screw thread of the output interface 10, therefore, the sealed bag 1 and the air extracting device 2 can be manually jointed together through the first screw thread of the output interface 10 and the second screw thread of the input interface 20.

As disclosed in FIG. 1B, the air extracting device 2 can be jointed with the sealed bag 1 through the input interface 20 and the output interface 10. After the air extracting device 2 is activated, the air extracting device 2 extracts air from the confined space inside the sealed bag 1 through the valve 12 of the output interface 10, and eventually creates a vacuum or a condition near vacuum on the inside of the sealed bag 1. By doing so, the volume of the sealed bag 1 can be extremely compressed, therefore, the user can store the sealed bag 1 as well as the items in the sealed bag 1 more easily, or the user can maintain the freshness of food stored in the sealed bag 1.

It should be mentioned that the valve 12 should be kept closed regularly for preventing air flowing into and out of the sealed bag 1. After the air extracting device 2 is activated, the valve 12 slightly opens due to the suction of the air extracting device 2, so the air extracting device 2 is able to extract air from the confined space of the sealed bag 1 through the opened valve 12. After the air extracting device 2 is turned off, the valve 12 returns to a close status.

In another embodiment, the sealed bag 1 can be arranged with a seal lid (not shown). The seal lid is used to cover the output interface 10 (i.e., to cover the valve 12 in the output interface 10) of the sealed bag 1 after the input interface 20 of the air extracting device 2 is separated from the output interface 10, so as to ensure the space is confined in the sealed bag 1.

Figure 2:
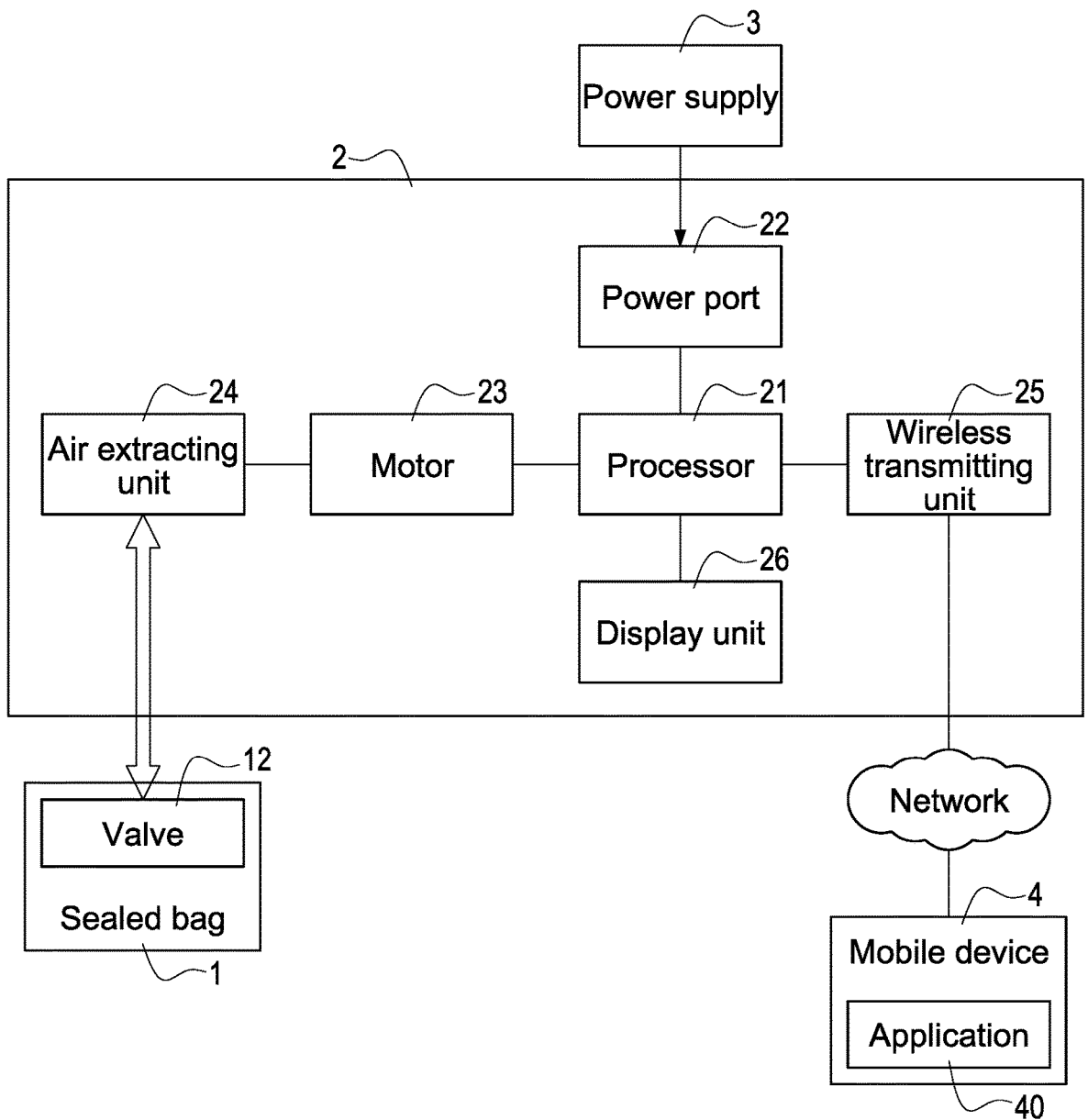
FIG. 2 is a block diagram of an air extracting device of a first embodiment according to the present invention.

FIG. 2 is block diagram of an air extracting device of a first embodiment according to the present invention. In one embodiment, the air extracting device 2 at least includes a processor 21, a power port 22, a motor 23, an air extracting unit 24, and a wireless transmitting unit 25. Further, the air extracting device 2 has an external case for covering the processor 21, the power port 22, the motor 23, the air extracting unit 24, and the wireless transmitting unit 25. The input interface 20 is arranged on the external case, so the air extracting device 2 can be jointed with the output interface 10 of the sealed bag 11 through the input interface 20.

The air extracting device 2 is connected to a power supply 3 through the power port 22 for receiving load current (or load voltage) provided by the power supply 3. In one embodiment, the power supply 3 is an internal power source (such as a battery). In another embodiment, the power supply 3 is connected to external power sources (such as supply mains or additional batteries) to receive the load current or the load voltage.

In the present embodiment, the power port 22 can be multiple kinds of connectors with at least one power pin, such as a universal serial bus (USB) connector, a Micro USB connector, a USB Type-C connector, a DC Jack connector, or a power dock, etc., but not limited thereto.

The processor 21 is electrically connected with the power port 22 to receive the load current provided by the power supply 3 through the power port 22. The air extracting device 2 in the present invention further includes a switch electrically connected with the processor 21 (not shown). In one embodiment, the air extracting device 2 activates the processor 21 after the switch is triggered by the user, and then the processor 21 asks the power supply 3 to provide the load current to the air extracting device 2.

The motor 23 is electrically connected with the processor 21, and the air extracting unit 24 is electrically connected with the motor 23. In the present invention, the motor 23 rotates by requiring the load current from the processor 21. When the motor 23 starts rotating, the air extracting unit 24 can be driven by the motor 23 to execute an extracting action for extracting air from outside of the air extracting device 2.

When the air extracting device 2 is jointed with the sealed bag 1 through the input interface 20 and the output interface 10, the position of the air extracting unit 24 of the air extracting device 2 will be directly facing the position of the valve 12 of the sealed bag 1. When the air extracting unit 24 is driven to execute the extracting action by the rotation of the motor 23, the air extracting unit 24 can directly extract air from the confined space inside the sealed bag 1 through the valve 12 of the sealed bag 1, and the confined space of the sealed bag 1 can eventually become a vacuum or a reach a condition near vacuum.

As disclosed above, the motor 23 of the air extracting device 2 rotates based on the load current distributed by the processor 21, so the motor 23 can drive the air extracting unit 24 to execute the extracting action. While the air extracting unit 24 executes the extracting action, the processor 21 maintains a fixed voltage without dropping and keeps monitoring the load current required by the motor 23 for rotating, and keeps calculating a remaining time required for the extracting action executed by the air extracting unit 24 based on a variation of the load current. In one embodiment, the remaining time required for the extracting action means the length of time needed for the confined space of the sealed bag 1 to become a vacuum or reach a condition near vacuum and to satisfy a standard requirement (discussed in detail in the following).

In particular, following the execution of the extracting action, the amount of air inside the sealed bag 1 will decrease. As long as the amount of air decreases, the air pressure in the sealed bag 1 will get smaller, hence increasing the loading of the motor 23 while the motor 23 keeps rotating. In the meantime, the rotating speed of the motor 23 reduces due to the increased loading. A counter electromotive force of the motor 23 is a function of the rotating speed of the motor 23 which is proportional to the rotating speed. When the rotating speed reduces, the counter electromotive force of the motor 23 reduces as well, it turns out the motor 23 needs a larger load current for rotation. In other words, the load current required by the motor 23 is inversely proportional to the air amount remaining in the confined space of the sealed bag 1.

More specifically, an input current required by the motor 23 for rotation can be continually calculated according to the following formula: $I=(V-Ke(W))/R$. In the above formula, R indicates a resistance value of the motor 23, $Ke(W)$ indicates a counter electromotive force constant of a function related to the rotating speed of the motor 23, V indicates a fixed voltage, and I indicates the input current.

In one embodiment, the processor 21 can be preset with a critical current value. The critical current value has been previously tested and stored in the processor 21. When the load current required by the motor 23 exceeds the critical current value, the efficiency of the extracting action perform by the air extracting device 2 will be lower than an expected value (for example, huge power needs to be consumed, or only bit more air can be further extracted, etc.), and it may also cause potential dangers (for example, the power supply 3 and/or the air extracting device 2 may be burned due to the required load current being larger than the critical current value). In this embodiment, the remaining time required for the extracting action equals the length of time left for the load current currently required by the motor 23 to rise to the critical current value. However, the above description is only one of the exemplary embodiments, not limited thereto.

In one embodiment, the manufacturer of the air extracting device 2 can use the air extracting device 2 to joint with the sealed bag 1, and activate the air extracting device 2 to extract air from the inside of the sealed bag 1 after the air extracting device 2 has been produced. When the sealed bag 1 is compressed and reaches an acceptable status, the load current required by the motor 23 of the air extracting device 2 has been recorded. Next, the manufacturer can store the recorded load current to processor 21 of each air extracting device 2 to be regarded as the critical current value. Therefore, every air extracting device 2 produced by same manufacturer can provide the same or a similar extracting efficiency. However, the above description is only one of the exemplary embodiments, not limited thereto.

The wireless transmitting unit 25 is electrically connected with the processor 21. In one embodiment, the air extracting device 2 can wirelessly connect to a mobile device 4 such as a smart phone, a laptop, etc. carried by the user through the wireless transmitting unit 25, so as to wirelessly transmit the remaining time required for the extracting action to the mobile device 4 to be displayed on the mobile device 4. In this scenario, the user can see the remaining time required by the air extracting device 2 to make the inside of the sealed bag 1 become vacuum or reach a condition near vacuum directly on the mobile device 4 while using the air extracting device 2. Therefore, the user does not have to wait beside the air extracting device 2, and the flexibility of use of the air extracting device 2 can be improved and user's time can be saved accordingly.

In one embodiment, the wireless transmitting unit 25 can be a Bluetooth unit, a Wi-Fi unit, a radio frequency (RF) unit, or a near field communication (NFC) unit, etc., but not limited thereto. The mobile device 4 can be installed with an application (APP) 40 corresponding to the air extracting device 2. The mobile device 4 can establish a wireless connection with the air extracting device 2 by executing the application 40, so as to receive the remaining time required for the extracting action from the air extracting device 2 to display on the mobile device 4.

In another embodiment, the air extracting device 2 further includes a display unit 26 electrically connected with the processor 21. The display unit 26 can be, but is not limited to, a light emitting diode (LED) unit, a liquid crystal display (LCD), or an ePapper display. In this embodiment, the air extracting device 2 can directly show the remaining time required for the extracting action on the display unit 26. As a result, the user does not have to carry an additional mobile device 4, so the flexibility of use of the air extracting device 2 can be further improved.

Figure 3:
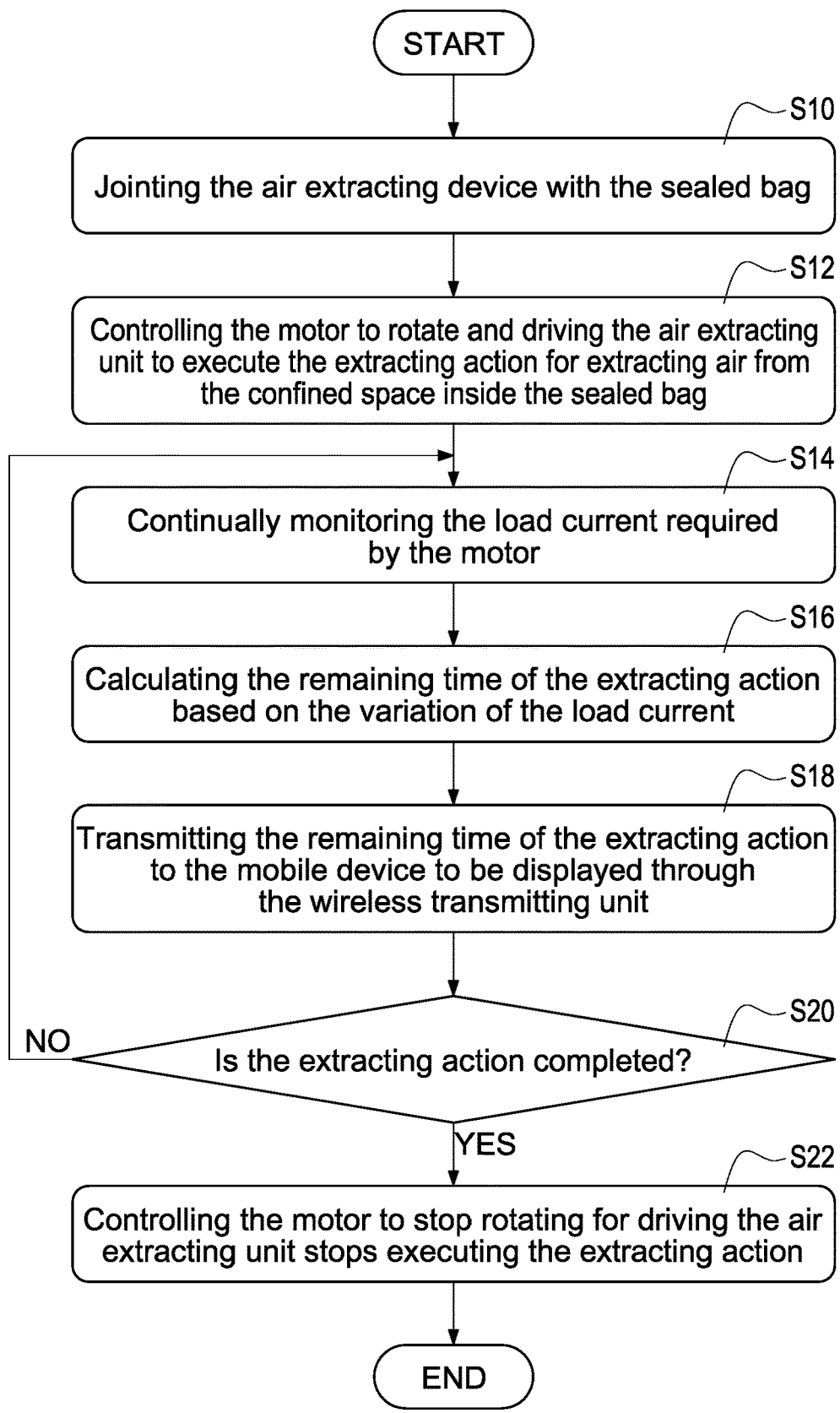
FIG. 3 is a flowchart for calculating a remaining time required for an extracting action of a first embodiment according to the present invention.

FIG. 3 is a flowchart for calculating a remaining time required for an extracting action of a first embodiment according to the present invention. FIG. 3 discloses a method for calculating the remaining time required for the extracting action (referred to as the calculating method hereinafter), the calculating method is used by the air extracting device 2 as shown in FIG. 2, for the air extracting device 2 to calculate the remaining time required for the extracting action to be completed when performing the extracting action to the sealed bag 1 jointed with the air extracting device 2.

As shown in FIG. 3, before activating the air extracting device 2 of the present invention, a user needs to joint the air extracting device 2 with the sealed bag 1 (step S10). Specifically, the user joints the input port 20 of the air extracting device 2 with the output port 10 of the sealed bag 1, and ensures the position of the air extracting unit 24 in the air extracting device 2 corresponds to the position of the valve 12 on the sealed bag 1.

Next, the processor 21 of the air extracting device 2 can be activated after the air extracting device 2 receives an external trigger (for example, the user presses an ON/OFF switch on the air extracting device 2). After being activated, the processor 21 receives a load current from a power supply 3 connected to the air extracting device 2 to control the motor 23 in the air extracting device 2 to rotate and drive the air extracting unit 24 to execute an extracting action due to the rotation of the motor 23, so as to extract air from the confined space inside the sealed bag 1 through the extracting action (step S12). When executing the extracting action, the air extracting unit 24 extracts air directly from the confined space of the sealed bag 1 through the valve 12 arranged on the sealed bag 1, in other words, the air extracting unit 24 cannot extract air from the outside of the sealed bag 1.

While the air extracting unit 24 executes the extracting action, the processor 21 keeps monitoring the load current currently required by the motor 23 (step S14). As discussed above, the load current required by the motor 23 is inversely proportional to the air amount remaining in the confined space of the sealed bag 1. While the air amount remaining in the sealed bag 1 reduces, the air pressure in the sealed bag 1 gets smaller, therefore, in a condition of adopting a fixed voltage, the load current required by the motor 23 for a rotation will become larger.

When monitoring the load current, the processor 21 keeps calculating a variation of the load current required by the motor 23, and then calculates the remaining time required for the extracting action executed by the air extracting unit 24 based on the variation of the load current (step S16).

In this embodiment, the remaining time equals the length of time left for the extracting action to be completed and make the inside of the sealed bag 1 become a vacuum or reach a condition near vacuum. Additionally, the processor 21 immediately transmits the calculated remaining time to the mobile device 4 of the user through the wireless transmitting unit 25 for the remaining time to be displayed on the mobile device 4 (step S18). In this case, the user can clearly know the length of time the air extracting device 2 needs for completing the extracting action, and the user does not have to waste time waiting beside the air extracting device 2.

In another embodiment, the air extracting device 2 includes the display unit 26 electrically connected with the processor 21, and the processor 21 can directly control the display unit 26 to display the calculated remaining time in the step S18. In this manner, the user does not have to frequently use the mobile device 4, and the air extracting device 2 can be more easily used.

After the step S18, the processor 21 keeps determining whether the extracting action is completed (step S20), and re-executes the step S14 to the step S18 before the extracting action is completed for continually monitoring the load current, continually calculating the remaining time required for the extracting action, and continually transmitting the calculated remaining time to the mobile device 4 for being displayed (or displaying the calculated remaining time on the display unit 26).

When determining that the extracting action is completed in the step S20, the processor 21 further controls the motor 23 to stop rotating, so as to drive the air extracting unit 24 to stop executing the extracting action (step S22). Through the automatic controlling manner of the step S22, the user does not have to determine the status of the sealed bag 1 by their bare eyes, and does not have to manually turn off the air extracting device 2 when the extracting action is completed, which is very convenient for the user.

In a first embodiment, the processor 21 determines that the extracting action is completed by counting the remaining time down to zero in the step S20. In a second embodiment, the processor 21 determines the current air pressure in the sealed bag 1 and/or the loading based on the load current currently required by the motor 23, and determines that the extracting action is completed when the air pressure and/or the loading reaches a pre-defined vacuum point. In a third embodiment, the processor 21 determines that the extracting action is completed when the load current currently required by the motor 23 reaches a pre-defined critical current value. However, the above descriptions are only few embodiments of the present invention, but not limited thereto.

Figure 4:
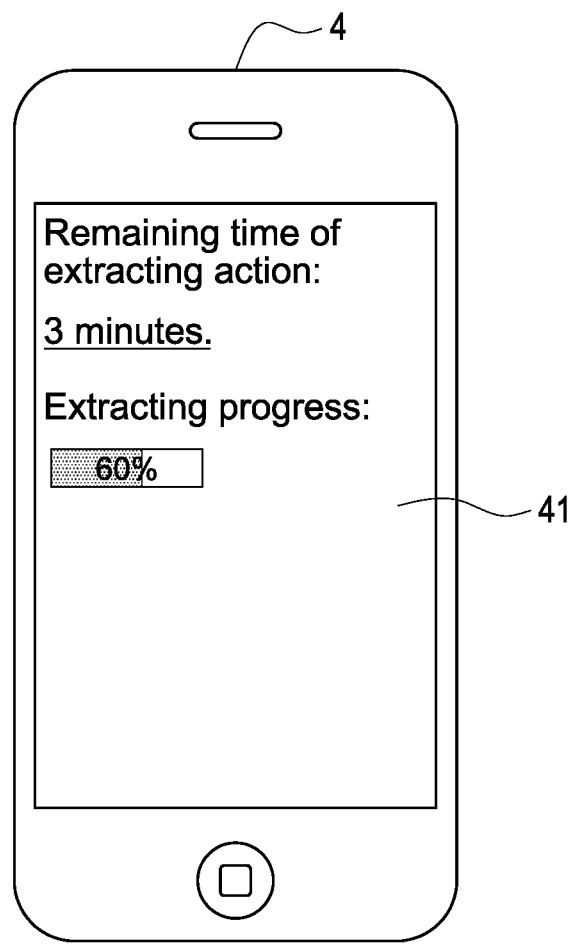
FIG. 4 is a schematic diagram showing the remaining time required for the extracting action of a first embodiment according to the present invention.

FIG. 4 is a schematic diagram showing the remaining time required for the extracting action of a first embodiment according to the present invention. As shown in FIG. 4, if the mobile device 4 has the application 40 installed, the mobile device 4 is able to establish a wireless connection with the air extracting device 2 to receive the remaining time required for the extracting action sent from the air extracting device 2 through running the application 40. In this embodiment, the mobile device 4 displays the received remaining time on a displaying monitor 41 thereon.

As shown in FIG. 4, the mobile device 4 runs the application 40 for receiving and displaying the remaining time required (for example, 3 minutes left) for the extracting action executed by the air extracting device 2, or calculating and displaying an extracting progress (for example, 60% is done) of the extracting action executed by the air extracting device 2 according to the received remaining time as well as an execution time of the extracting action. By running the application 40 on the mobile device 4, the user can clearly know the current status of the sealed bag 1 directly on the mobile device 4, instead of waiting beside the air extracting device 2, which is relatively convenient.

Figure 5:
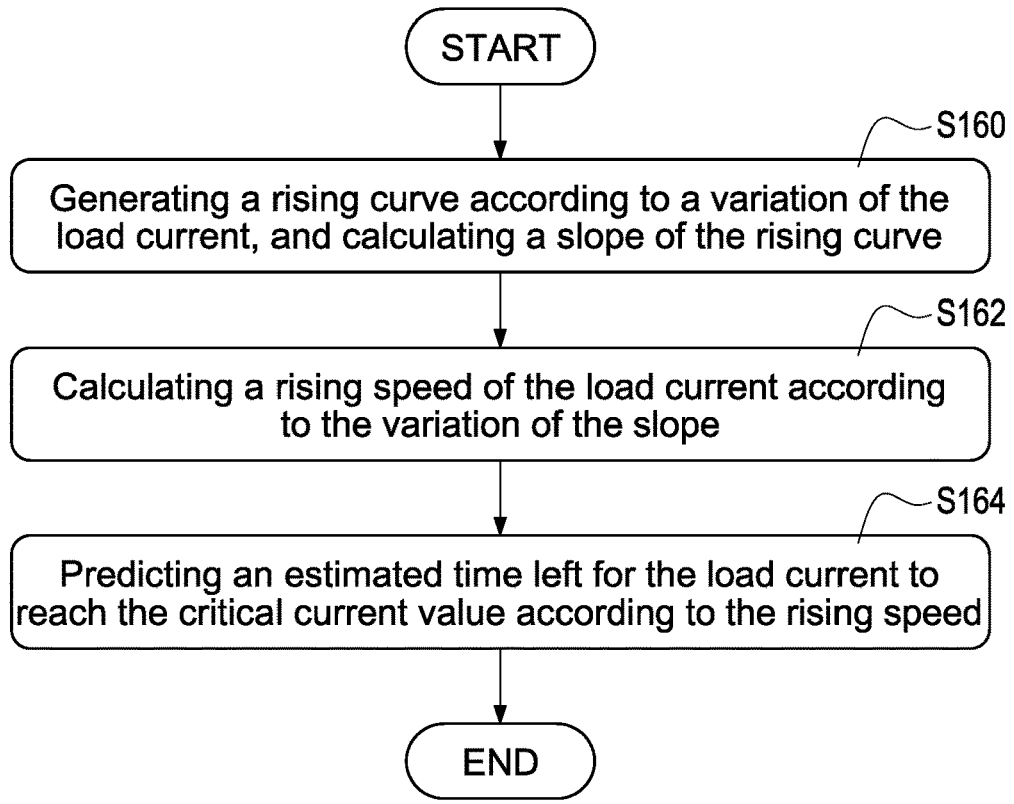
FIG. 5 is a flowchart for calculating the remaining time required for the extracting action of a second embodiment according to the present invention.
Figure 6:
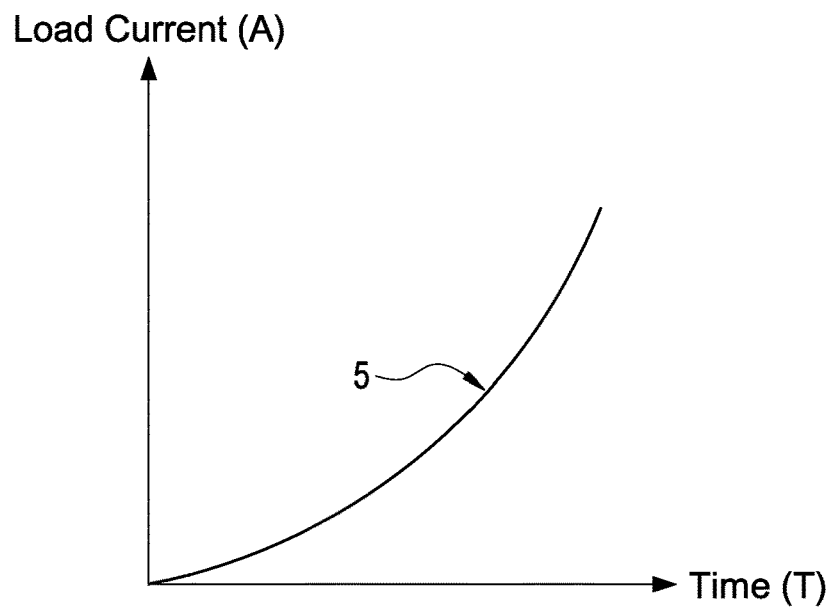
FIG. 6 is a schematic diagram showing a rising curve of load current of a first embodiment according to the present invention.

Please refer to FIG. 5 and FIG. 6, FIG. 5 is a flowchart for calculating the remaining time required for the extracting action of a second embodiment according to the present invention, FIG. 6 is a schematic diagram showing a rising curve of load current of a first embodiment according to the present invention. FIG. 5 is provided to describe in detail how the processor 21 calculates the remaining time required for the extracting action based on the variation of the load current in the step S16 shown in FIG. 3.

As shown in FIG. 5 and FIG. 6, the processor 21 of the air extracting device 2 monitors the motor 23 and obtains the load current required by the motor 23, and generates a rising curve 5 with respect to the load current according to a variation (such as a variation in 3 seconds, in 5 seconds, etc.) of the load current, and then calculates a slope of the generated rising curve 5 (step S160). Following the reduction of the air amount remained in the sealed bag 1, the load current required by the motor 23 for rotation increases, and a slope of the generated rising curve 5 will be changed due to the increased load current. According to this characteristic, the processor 21 can calculate a rising speed of the load current according to the variation of the slope of the rising curve 5 (step S162). In one embodiment, the larger the variation of the slope is, the faster the rising speed of the load current will be.

As described above, the processor 21 has been preset with a critical current value, which is regarded as a set-point for the air extracting device 2 to stop the execution of the extracting action. In this embodiment, the processor 21 first calculates the rising speed of the load current, and then predicts, according to the rising speed, an estimated time left for the load current to keep rising to reach the critical current value (step S164). In this embodiment, the processor 21 regards the estimated time calculated in the step S164 as the aforementioned remaining time required for the extracting action, and the processor 21 transmits the remaining time (i.e., the estimated time) to the mobile device 4 to be displayed on the mobile device 4, or directly displays the remaining time on the display unit 26 of the air extracting device 2.

When the remaining time required for the extracting action (i.e., the estimated time) counts down to zero, it means the load current currently required by the motor 23 has reached (or about to reach) the critical current value. In this scenario, even if the inner space of the sealed bag 1 has yet to become a vacuum, the processor 21 will still control the motor 23 to stop rotating, so as to prevent the energy from being wasted, and to prevent the risk of the air extracting device 2 and/or the power supply 3 from being burned. In this circumstance, the processor 21 will consider that the extracting action executed by the air extracting unit 24 is completed, and the processor 21 will send a notification message to the mobile device 4 (or directly display the notification message on the display unit 26) for the user to be informed of the extracting action being completed on the sealed bag 1.

It should be mentioned that the present invention uses the variation of the load current required by the motor 23 to calculate the remaining time required for the extracting action executed by the air extracting unit 24, so if the load current required by the motor 23 doesn't change, or only changes in a tiny amount, the processor 21 may not successfully calculate the remaining time required for the extracting action.

Figure 7:
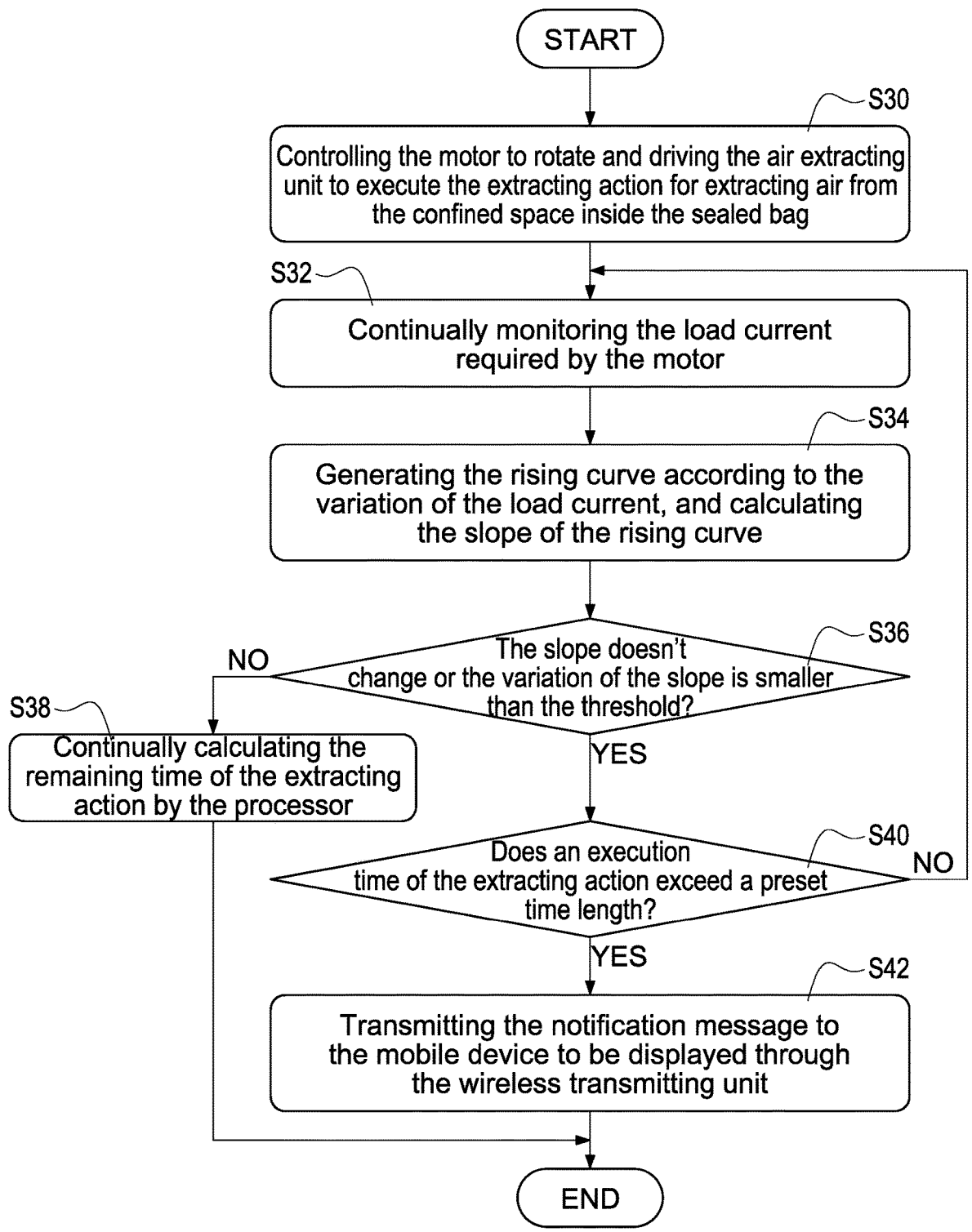
FIG. 7 is a flowchart for calculating the remaining time required for the extracting action of a third embodiment according to the present invention.

FIG. 7 is a flowchart for calculating the remaining time required for the extracting action of a third embodiment according to the present invention. FIG. 7 is provided to further describe how the processor 21 works if the processor 21 cannot successfully calculate the remaining time required for the extracting action.

In this embodiment, the processor 21 controls the motor 23 to start rotating after receiving an external trigger, and the rotated motor 23 drives the air extracting unit 24 to execute the extracting action for extracting air from the inside of the sealed bag 1 (step S30). The processor 21 keeps monitoring the load current required by the motor 23 during the execution of the extracting action (step S32), and the processor 21 generates the rising curve 5 with respect to the required load current according to the variation of the load current, and then calculates the slope of the rising curve 5 (step S34).

As mentioned above, when the air extracting device 2 joints with the sealed bag 1 through the input interface 20 and the output interface 10 and the air extracting unit 24 directly extracts air from the confined space in the sealed bag 1 through the valve 12 on the sealed bag 1, the air amount remained in the sealed bag 1 decreases gradually, and the air pressure in the sealed bag 1 will accordingly get smaller, and the load current required by the motor 23 for rotating will be increases. In other words, during the time the air extracting device 2 normally executes the extracting action, the load current required by the motor 23 gradually increases and has an obvious variation.

If the air extracting device 2 and the sealed bag 1 are not properly jointed with each other, the position of the air extracting unit 24 will not correctly correspond to the position of the valve 12 on the sealed bag 1. In this case, the air extracting unit 24 will not be extracting the air from only the confined space of the sealed bag 1, therefore, the air pressure in the sealed bag 1 will not have an obvious variation during the execution of the extracting action, and the load current required by the motor 23 will not have an obvious variation as well. More specifically, if the air extracting device 2 does not joint with the sealed bag 1 properly, the processor 21 cannot detect an obvious variation of the load current, the rising curve 5, and the slope of the rising curve 5.

As shown in FIG. 7, after calculating the slope of the rising curve 5 with respect to the load current, the processor 21 further determines if the slope doesn't change (i.e., the load current doesn't change), or if the variation of the slope is smaller than a preset threshold (step S36). If the slope does change and the variation of the slope is larger than the threshold, the processor 21 then calculates the remaining time required for the extracting action according to the steps disclosed in FIG. 5 (step S38).

If the processor 21 determines in the step S36 that the slope doesn't change, or the variation of the slope is smaller than the threshold, the processor 21 further determines whether an execution time of the extracting action exceeds a preset length of time (step S40). Before the execution time of the extracting action exceeds the preset length of time (for example, only executes for 5 seconds, 10 seconds, etc.), the processor 21 goes back to the step S32 for continually monitoring the load current of the motor 23, generating the rising curve 5, and calculating the slope of the rising curve 5.

On the other hand, if the processor 21 determines, in the step S40, that the execution time of the extracting action exceeds the preset time length, the processor 21 then generates a notification message and transmits the notification message to the mobile device 4 to be displayed thereon through the wireless transmitting unit 25 (step S42). Therefore, the mobile device 4 can inform the user to check whether the air extracting device 2 and the sealed bag 1 are jointed correctly, or if the sealed bag 1 is broken.

In another embodiment, the processor 21 displays the notification message directly on the display unit 26 of the air extracting device 2 by using image content or text content, or broadcasts the notification message through a buzzer (not shown) on the air extracting device 2 by using voice content, not limited thereto.

The present invention calculates the remaining time required for the extracting action performed by the air extracting device 2 based on the variation of the load current required by the motor 23 of the air extracting device 2, and informs the user about how long is left for the extracting action to be completed, therefore, the user does not have to wait beside the air extracting device 2, which is convenient for the user to schedule other tasks without wasting their time.

As the skilled person will appreciate, various changes and modifications can be made to the described embodiment. It is intended to include all such variations, modifications and equivalents which fall within the scope of the present invention, as defined in the accompanying claims.

What is claimed is:

1. An air extracting device (2) for extracting air from a sealed bag (1), comprising:
    a power port (22), connected to a power supply (3);
    a processor (21) electrically connected with the power port (22), configured to receive a load current provided by the power supply (3) through the power port (22);
    a wireless transmitting unit (25) electrically connected with the processor (21), configured to wirelessly connect to an external mobile device (4) for the air extracting device (2);
    a motor (23) electrically connected with the processor (21), configured to receive the load current from the processor (21) for rotating; and
    an air extracting unit (24) electrically connected with the motor (23), jointed with the sealed bag (1) for the air extracting device (2), and driven by the motor (23) to execute an extracting action for extracting air from a confined space inside the sealed bag (1);
    wherein, the processor (21) is configured to monitor the load current required by the motor (23) while the air extracting unit (24) executes the extracting action, and is configured to calculate a remaining time required for the extracting action to be completed based on a variation of the load current, wherein the load current is inversely proportional to an air amount remained in the confined space;
    wherein, the processor (21) transmits the calculated remaining time to the mobile device (4) to be displayed thereon through the wireless transmitting unit (25).

2. The air extracting device as claimed in claim 1, further comprising an application (40), wherein the application (40) is configured to be installed in the mobile device (4), and the mobile device (4) establishes a wireless connection with the air extracting device (2) for receiving the remaining time required for the extracting action from the air extracting device (2) to display through executing the application (40).

3. The air extracting device as claimed in claim 1, further comprising a display unit (26) electrically connected with the processor (21), wherein the processor (21) is configured to control the display unit (26) to display the remaining time required for the extracting action.

4. The air extracting device as claimed in claim 1, wherein the processor (21) is configured to calculate a slope of a rising curve (5) of the load current, to calculate a rising speed of the load current according to a variation of the slope, and to predict an estimated time for the load current to rise to a critical current value according to the calculated rising speed, wherein the remaining time required for the extracting action equals the estimated time.

5. The air extracting device as claimed in claim 4, wherein the processor (21) is configured to preset the critical current value, and to control the motor (23) to stop rotating when the load current required by the motor (23) reaches the critical current value.

6. A method for calculating remaining time required for extracting action of an air extracting device (2), adopted by the air extracting device (2) having at least a processor (21), a wireless transmitting unit (25), a motor (23), and an air extracting unit (24), wherein the air extracting device (2) jointed with a sealed bag (1) through the air extracting unit (24), and the method comprising:
  a) receiving a load current from a power supply (3) by the processor (21) for controlling the motor (23) to rotate;
  b) driving the air extracting unit (24) to execute an extracting action by the rotated motor (23) for extracting air from a confined space inside the sealed bag (1);
  c) continually monitoring the load current required by the motor (23) by the processor (21) while the air extracting unit (24) executes the extracting action, wherein the load current is inversely proportional to an air amount remained in the confined space;
  d) calculating a remaining time required for the extracting action to be completed according to a variation of the load current; and
  e) transmitting the calculated remaining time required for the extracting action to an external mobile device (4) to be displayed on the mobile device (4) by the processor (21) through the wireless transmitting unit (25).

7. The method as claimed in claim 6, wherein the step d) comprises following steps:
  d1) calculating a slope of a rising curve (5) of the load current;
  d2) calculating a rising speed of the load current based on the slope; and
  d3) predicting an estimated time for the load current to reach a critical current value according to the rising speed, wherein the remaining time required for the extracting action equals the estimated time.

8. The method as claimed in claim 7, wherein the processor (21) is configured to preset the critical current value, and the method further comprising a step f): controlling the motor (23) to stop rotating by the processor (21) when the load current reaches the critical current value.

9. The method as claimed in claim 7, wherein the step d) further comprises following steps:
  d4) determining if the slope doesn't change or a variation of the slope is smaller than a threshold by the processor (21);
  d5) executing the step d2) and the step d3) when the variation of the slope is larger than the threshold;
  d6) determining if an execution time of the extracting action is exceeding a preset time length if the slope doesn't change or the variation of the slope is smaller than the threshold;
  d7) re-executing the step c) for continually monitoring the load current before the execution time exceeds the preset time length; and
  d8) transmitting a notification message to the mobile device (4) through the wireless transmitting unit (25) when the execution time of the extracting action exceeds the preset time length.

10. The method as claimed in claim 7, further comprising a step g): controlling a display unit (26) of the air extracting device (2) to display the remaining time required for the extracting action by the processor (21).

* * * * *